(12) United States Patent
Meier et al.

(10) Patent No.: US 9,394,957 B2
(45) Date of Patent: Jul. 19, 2016

(54) CONNECTION OF SPRING ENDS

(71) Applicant: BAUMANN FEDERN AG, Rüti (CH)

(72) Inventors: Roland Meier, Wald (CH); David Scheidegger, Tann (CH); Andreas Hohl, Rüti (CH)

(73) Assignee: BAUMANN FEDERN AG, Rüti (CH)

( * ) Notice: Subject to any disclaimer, the term of this patent is extended or adjusted under 35 U.S.C. 154(b) by 0 days.

(21) Appl. No.: 14/406,857

(22) PCT Filed: May 30, 2013

(86) PCT No.: PCT/EP2013/061167
§ 371 (c)(1),
(2) Date: Dec. 10, 2014

(87) PCT Pub. No.: WO2013/186059
PCT Pub. Date: Dec. 19, 2013

(65) Prior Publication Data
US 2015/0159718 A1 Jun. 11, 2015

(30) Foreign Application Priority Data

Jun. 11, 2012 (CH) ........................................ 0805/12

(51) Int. Cl.
| F16F 1/12 | (2006.01) |
| F16F 1/04 | (2006.01) |
| B23K 26/22 | (2006.01) |
| B23K 31/02 | (2006.01) |

(52) U.S. Cl.
CPC .................. *F16F 1/045* (2013.01); *B23K 26/22* (2013.01); *B23K 31/02* (2013.01); *F16F 1/123* (2013.01)

(58) Field of Classification Search
CPC .............. F16F 1/02; F16F 1/04; F16F 1/06; F16F 1/065; F16F 1/12; F16F 1/123; F16F 15/123; F16F 15/1232; F16F 15/1343; F16F 1/1235
See application file for complete search history.

(56) References Cited

U.S. PATENT DOCUMENTS

| 2,530,163 A | 11/1950 | Goodwin | |
| 2,991,064 A | 7/1961 | De Jean | |
| 3,011,775 A * | 12/1961 | MacLeod | F16F 1/042 138/133 |
| 3,186,701 A | 6/1965 | Skinner, Sr. | |
| 3,323,785 A | 6/1967 | Mather | |
| 3,468,527 A | 9/1969 | Mather | |
| 4,880,217 A | 11/1989 | Navarro, Sr. | |
| 5,503,375 A * | 4/1996 | Balsells | F16F 1/045 267/167 |
| 5,709,371 A * | 1/1998 | Balsells | F16F 3/04 267/167 |
| 5,791,638 A * | 8/1998 | Balsells | F16F 3/04 267/167 |
| 2004/0245686 A1 | 12/2004 | Balsells | |
| 2010/0090379 A1 | 4/2010 | Balsells | |

FOREIGN PATENT DOCUMENTS

| DE | 2429390 B1 | 5/1975 | |
| FR | 2902161 A1 * | 12/2007 | ............... F16F 1/06 |

* cited by examiner

*Primary Examiner* — Anna Momper
(74) *Attorney, Agent, or Firm* — Lucas & Mercanti, LLP; Klaus P. Stoffel

(57) ABSTRACT

A connecting of spring ends of a strand of springs, wherein it is provided that the winding diameter of the end windings is reduced, at least in the area of each of the two ends, and the pitch of the end windings is increased in the area of each of the two ends relative to the pitch in the spring body, and that the two ends overlap in contact with one another over a section and are finally connected to one another.

14 Claims, 2 Drawing Sheets

Detail A

CONNECTION OF SPRING ENDS

CROSS-REFERENCE TO RELATED APPLICATIONS

The present application is a 371 of International application PCT/EP2013/061167, filed May 30, 2013, which claims priority of CH 00805/12, filed Jun. 11, 2012, the priority of these applications is hereby claimed and these applications are incorporated herein by reference.

BACKGROUND OF THE INVENTION

The present invention pertains to a connection of two spring ends of a spring strand such as in particular of a garter spring or an annular spring strand in the form of, for example, a miniature annular ring with canted windings or a miniature garter spring. The present invention also pertains to a method for connecting two spring ends and to the production of an annular spring with canted windings or of a garter spring, especially of the miniature type.

Such annular spring strands are known as hose springs or annular spring strands with canted windings. They are also known as so-called "garter springs" or "canted coil springs". Such springs are used, for example, for seals, electrical contacts, and mechanical plug-in connections.

The two ends of an individual spring strand are usually connected positively to each other to form the garter spring by providing one end with a smaller diameter and by screwing it into the other end. Garter springs of this type are described in, for example, U.S. Pat. No. 2,530,163, U.S. Pat. No. 3,186,701, and U.S. Pat. No. 4,880,217. A disadvantage is that these screwed connections lead to a considerable stiffening of the spring, extending over several windings. Especially in the case of very small garter springs, this stiffening has a negative effect.

As a rule, the two ends of a canted coil spring are connected to each other by welding. Such canted coil springs are described in, for example, US 2004/0245686 and in US 2010/0090379. The manner in which the connection is formed is not described in detail but rather merely indicated as a point in the figure without any detailed explanation. Both patent documents describe only positive types of connections. In U.S. Pat. No. 3,323,785, the connection of the two ends is expressed by the words "formed into an annulus by suitably attaching the opposite ends of the spring to each other", but the document does not go into any further detail. U.S. Pat. No. 3,468,527 states that the ends are welded together but does not give a detailed description of how this welding must be done and what form it should take ("the ends joined together by welding to form a unitary annulus").

In addition to the materially bonded connection of the two ends of a canted coil spring, positive-locking connections with specially configured shapes at the ends are also known, such as those described in US 2004/0245686. These suffer from the disadvantage that they cause a change in the stiffness of the spring in the area of the connection, which can have disadvantageous effects on the function of the spring.

End windings resting against each other in the circumferential direction can also lead to an unallowably large reduction in the spring travel of the spring in the area of the connection. This means that a canted coil spring can be compressed to a lesser degree in the connection area than in the rest of the spring and is thus unable to function to it full extent.

The fine positioning of the two spring ends with respect to each other is another problem which has not so far been solved satisfactorily in the production of these connections, especially in the case of very small garter springs and coil springs with or without canted coils. In the case of very small garter springs and spring strands with or without canted coils, the correct positioning of the two ends with respect to each other is very difficult, both with respect to the centering of the two ends on each other and also with respect to the position in the circumferential direction required to prevent an air gap between the two ends.

SUMMARY OF THE INVENTION

An object of the present invention is thus to provide spring ends of such a kind that the connection of these ends to each other, even in the case of the smallest or miniaturized springs such as the smallest garter springs and coil springs with or without canted coils, first does not lead to any stiffening of the connection, second does not lead to any unallowable limitation of the spring travel of the canted coil spring, and third makes it possible to bring the two ends together with the correct positioning.

The present invention solves the correct positioning problem by means of a suitable formation of the spring ends. The two ends of a spring strand are configured with a special form, so that one end, when brought into position, can engage slightly with the other end of the same spring strand, which guarantees that the two ends are positioned exactly. This is achieved in that the winding diameter of each end winding is decreased, at least in the area of each of the two ends, and in that the pitch of the end winding in the area of each end is increased in comparison to the pitch of the main body of the spring. After the ends have been correctly positioned, they are materially bonded together. This materially bonded connection, in contrast to a friction-locking or positive-locking connection, is present only over a short section of the two end windings. This type of connection leads to a significant decrease in the stiffening of the spring at the connection point; the stiffness at this point is on the order of the stiffness of a winding within the spring strand where no connecting points exist. In the case of canted coil springs, the connection area can be made so small that the windings in question can be compressed to about the same degree that the rest of the strand can be compressed. There is thus a minimum of interference with the spring function of the spring at the end of its working area. This means that the working area can be made larger than in the case of a conventional annular spring with widely overlapping end windings.

The spring strand consists of a material which allows material bonding, that is, for example, a material that can be welded, brazed, or adhesively bonded. In particular, metal alloys such as spring steel, stainless steel, copper alloys, titanium, or other suitable metals or metal alloys or even plastics or ceramics can be used.

The proposed connection of spring ends of a spring strand according to the invention is adapted, for example, to the production of so-called garter springs, in particular miniature garter springs or canted coil springs such as those used in connecting elements for electrical and/or mechanical connections and also in sealing elements. Of course, the connection proposed according to the invention is adapted in principle to the connection of the ends of a spring strand to each other.

Additional concrete variants of the connection and a specific method for connecting the two ends of a spring strand are defined in the dependent and other claims.

BRIEF DESCRIPTION OF THE DRAWINGS

The invention will now be explained in greater detail with reference to the attached figures.

DETAILED DESCRIPTION OF THE INVENTION

Figure 1B:
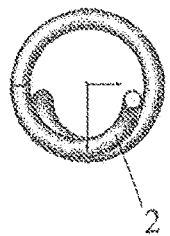
FIGS. 1a, 1b, and 1c show schematic longitudinal views of a straight spring strand with windings without spaces between them, comprising spring ends, which are adapted to produce a connection defined according to the invention, wherein 1b and 1c show plan views of the ends.
Figure 1A:
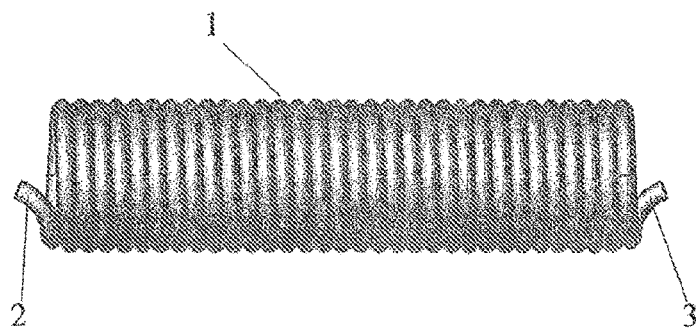
Figure 1C:
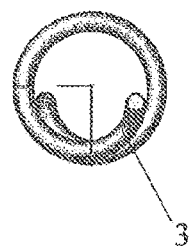

FIG. 1a show a longitudinal view of a spring strand 1, comprising two ends 2 and 3, adapted to the production of a connection according to the invention. The spring strand consists of windings, which rest against each other with no spaces between them. It can be seen that, in the area of each of the two ends 2 and 3, the pitch of each end winding is larger than the pitch of the windings in the rest of the spring body. FIGS. 1b and 1c show plan views of the two ends, wherein it is now easy to recognize that the diameter of the winding of each end winding of the two ends 2 and 3 is smaller than the winding diameter of the rest of the spring body.

Figure 2B:
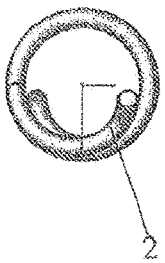
FIGS. 2a, 2b, and 2b show schematic longitudinal views of a straight spring strand with windings with spaces between them, comprising spring ends which are adapted to produce a connection defined according to the invention, wherein 2b and 2c show plan views of the ends.
Figure 2A:
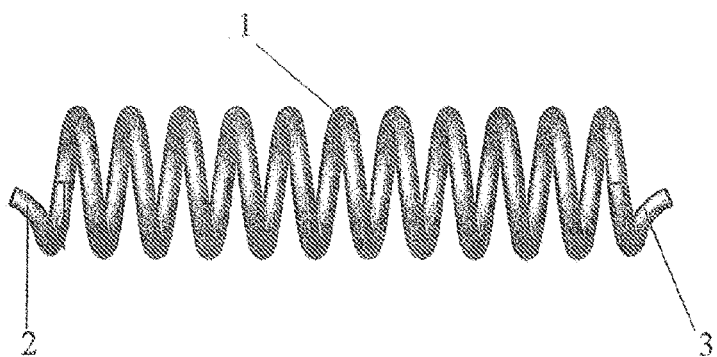
Figure 2C:
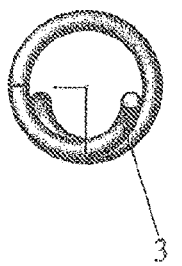

FIG. 2a shows a longitudinal view of a spring strand 1 comprising two ends 2 and 3, adapted to the production of a connection according to the invention. The spring strand consists of windings with spaces between them; they do not rest against each other. Again it can be seen from FIG. 2a that the pitch in the areas of the two ends 2 and 3 is larger than the pitch in the rest of the spring body. FIGS. 2b and 2c show again, in plan views of the two spring ends, how the winding diameter of each end winding is smaller than the winding diameter of the rest of the spring body.

Figure 3B:
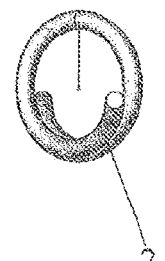
FIGS. 3a, 3b, and 3c show schematic longitudinal views of a canted coil spring with windings with spaces between them, comprising spring ends which are adapted to producing a connection according to the invention, wherein 3b and 3c show plan views of the ends.
Figure 3A:
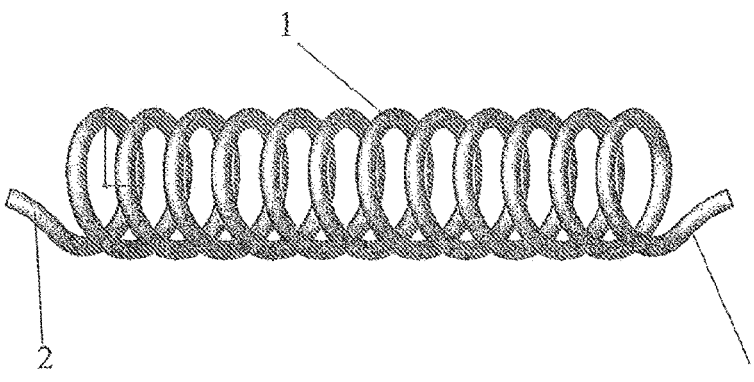

FIG. 3a shows a longitudinal view of a spring strand 1 with two ends 2, 3, adapted to the production of a connection according to the invention. The spring strand consists here of canted coils with spaces between them, i.e., they do not rest against each other. Within the course of each winding, one half of the winding has a large positive pitch, which the other half-winding has a negative or only slightly positive pitch, thus forming a spring strand with canted coils.

Figure 3C:
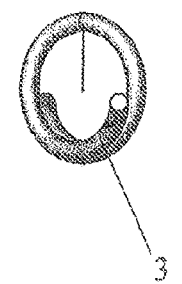

Over a certain length of the wire, the winding diameter of the ends 2 and 3 becomes smaller by, for example, one wire diameter, as shown in FIGS. 1, 2, and 3. Over a certain length of the wire, the two ends extend farther in the axial direction than the windings of the rest of the spring strand, which is achieved by increasing the pitch of the winding. When the spring strand is bent into a ring and the ends are brought around to face each other, this special configuration of the ends makes possible for them to assume the proper end position automatically. It is thus ensured that the two ends are aligned and in contact with each other in the end position, so that the two ends can be materially bonded together to form a closed ring 11, as shown by way of example in FIG. 4.

Figure 4:
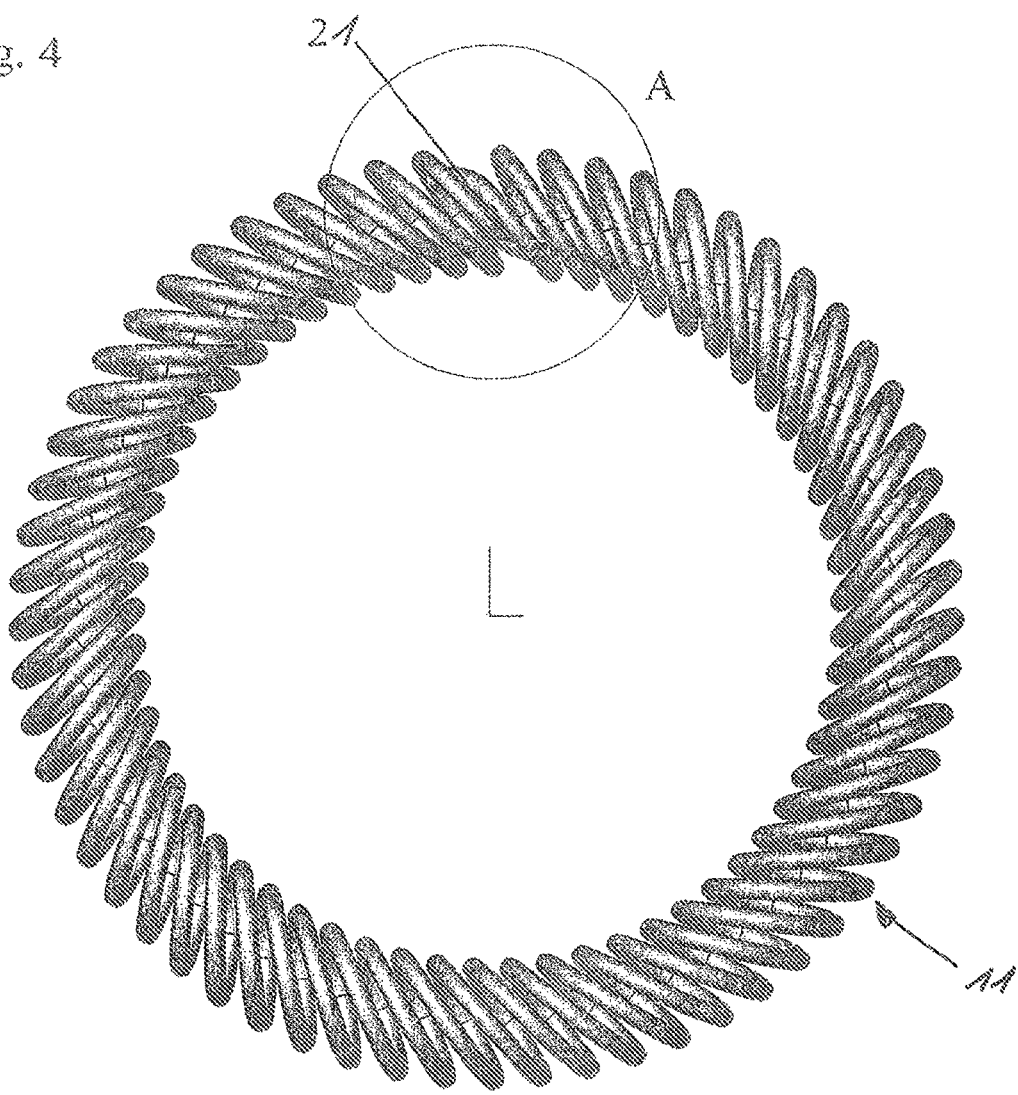
FIG. 4 shows a schematic diagram of a connection according to the invention forming a closed ring.
Figure 5:
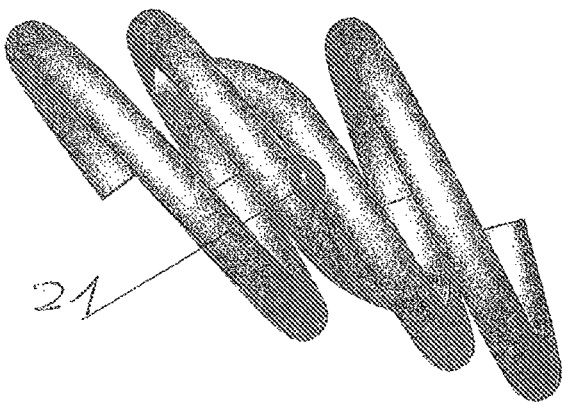
FIG. 5 shows a detailed view of the part of the closed ring of FIG. 4 where the two spring ends are connected.

FIG. 5 shows a detailed view of the connection between the two spring ends of FIG. 4, as a result of which connection a closed ring is formed. The part included in the view is indicated by the letter "A" in FIG. 4. FIG. 5 shows a spot weld 21 between the two spring ends 2 and 3 of the spring strand 1. This connection is preferably produced by means of welding, e.g., by laser welding or plasma welding.

Instead of welding, it is also possible, for course, to connect the two windings by means of an adhesive or by brazing. The important point is that it must be possible to weld, to braze, or to adhesively bond the material used for the spring strand. For this reason, stainless steel, for example, has proven to be a logical choice, wherein, of course, other metals or metal alloys such as copper, copper alloys, titanium, gold alloys, etc., are also suitable. Especially in the case of adhesive bonding, plastics which allow the production of spring strands such as reinforced plastics can also be used.

The illustrations of the two ends of the spring strand in FIGS. 1-5 are offered by way of example and serve to explain the present invention. It is obvious that the length over which the ends decrease in size can be different. The axial projection of the ends can also be different and can be achieved by using different lengths of the section of wire in question. The overlapping of the two ends, which occurs when the spring strand is formed into a ring, can also occur to different degrees. These different configurations of the spring ends can also, of course, be combined with each other.

The invention claimed is:

1. A spring strand comprising a body with a plurality of windings, end windings at opposing ends of the body of the spring strand, and two spring ends arranged on the end windings, wherein a winding diameter of the end windings is decreased with respect to the plurality of windings in the body at least in the area of each of the two ends, a pitch of the end windings is increased at least in the area of each of the two ends with respect to a pitch between the plurality of windings in the body of the spring strand, and sections of the two ends rest against and overlap each other and are materially bonded to each other.

2. The spring strand according to claim 1, wherein the body comprises a wire having a wire diameter, and the winding diameter of the end windings is reduced in the area of each of the two ends by at least the wire diameter.

3. The spring strand according to claim 1, wherein the body comprises a wire having a wire diameter, and the pitch of the end windings in the area of each of the two ends is increased by at least half of the wire diameter.

4. The spring strand according to claim 1, wherein, in a pre-bonded state, the body of the spring strand consists of the plurality of the windings without spaces between them except in the area at each of the ends with the increased winding pitch.

5. The spring strand according to claim 1, wherein, in a pre-bonded state, the spring strand consists of the plurality of windings with spaces between them.

6. The spring strand according to claim 1, wherein the spring strand consists of the plurality of windings tilted out of the plane lying at a right angle to a longitudinal axis of the spring, with spaces between the plurality of windings.

7. The spring strand according to claim 1, wherein the decrease in the winding diameter at each of the two ends extends over no more than half a winding.

8. The spring strand according to claim 1, wherein the increase in the winding pitch at each of the two ends extends over no more than half a winding.

9. The spring strand according to claim 1, wherein the two ends are materially-bonded by a connection at one or more points or on a line extending at least partially around a circumference of the winding.

10. The spring strand according to claim 1, wherein the two ends are connected by a welded connection, a brazed connection, or an adhesively bonded connection.

11. The spring strand according to claim 1, wherein the two end are connected by a welded connection including spot welds.

12. The spring strand according to claim 1, wherein the spring strand consists of stainless steel, copper, or a copper alloy, of a weldable or brazable metal alloy, or of plastic which can be formed into a wire and which can be materially bonded.

13. A method for producing a connection of two ends of a spring as recited in claim 1, including the steps of:
- bringing the two ends of the spring into contact with each other, and
- connecting the two spring ends by laser welding.

14. A method for producing an annular spring strand, comprising the steps of:
- bringing two ends of a spring according to claim 1 into contact with each other, and
- materially bonding the two ends together to form the annular spring strand.

\* \* \* \* \*